United States Patent [19]

Mügge et al.

[11] Patent Number: 5,362,529
[45] Date of Patent: Nov. 8, 1994

[54] THERMOPLASTIC LAMINATES

[75] Inventors: Joachim Mügge, Haltern; Stefan Röber, Marl; Roland Feinauer, Marl; Hans Jadamus, Marl, all of Germany

[73] Assignee: Huels Aktiengesellschaft, Marl, Germany

[21] Appl. No.: 17,190

[22] Filed: Feb. 12, 1993

[30] Foreign Application Priority Data

May 12, 1992 [DE] Germany .................. 4215609

[51] Int. Cl.$^5$ ............................................. B32B 15/08
[52] U.S. Cl. .................................. 428/35.7; 428/332; 428/423.1; 428/423.5; 428/474.4; 428/475.2; 428/480
[58] Field of Search ................... 428/475.2, 480, 423.1, 428/423.5, 423.7, 414, 347, 474.4, 420, 35.7, 34.1, 332, 482, 483, 475.2; 156/242, 310, 244.13, 306.3, 244.11

[56] References Cited

U.S. PATENT DOCUMENTS

| | | | |
|---|---|---|---|
| 3,378,602 | 4/1963 | Robertson | 260/857 |
| 3,987,033 | 10/1976 | Ojakaar | 428/480 |
| 4,242,488 | 12/1980 | Stanley et al. | 428/423.1 |
| 4,443,519 | 4/1984 | Donermeyer et al. | 428/336 |
| 4,461,805 | 7/1984 | Walrath et al. | 428/475.2 |
| 4,528,219 | 7/1985 | Yamada et al. | 428/480 |
| 4,608,313 | 8/1986 | Hickner et al. | 428/414 |
| 4,628,072 | 12/1986 | Shiraki et al. | 525/64 |
| 4,656,242 | 4/1987 | Swan et al. | 528/295.3 |
| 4,725,488 | 2/1988 | Swan et al. | 428/248 |
| 4,844,955 | 7/1989 | Graefe et al. | 428/420 |
| 4,855,181 | 8/1989 | Shimo et al. | 428/336 |
| 4,920,174 | 4/1990 | Bartz | 525/66 |
| 4,945,129 | 7/1990 | Mason et al. | 525/66 |
| 4,948,838 | 8/1990 | Jadamus et al. | 525/66 |
| 5,108,844 | 4/1992 | Blemberg et al. | 428/518 |

FOREIGN PATENT DOCUMENTS

| | | |
|---|---|---|
| 0071142 | 2/1983 | European Pat. Off. . |
| 0225049 | 6/1987 | European Pat. Off. . |
| 0384404 | 8/1990 | European Pat. Off. . |
| 2822394 | 11/1978 | Germany . |
| 3234590 | 4/1983 | Germany . |
| 7512917 | 5/1976 | New Zealand . |
| 1547480 | 6/1979 | United Kingdom . |

Primary Examiner—Paul J. Thibodeau
Assistant Examiner—Stephen Sand
Attorney, Agent, or Firm—Oblon, Spivak, McClelland, Maier & Neustadt

[57] ABSTRACT

Laminates having improved resistance to chemicals and improved frictional bonding between the layers are to be provided.

This is achieved by

I. a layer of a molding composition based on polyamide combined with

II. a layer of a molding composition based on a modified polyester.

Laminates having the desired improved property profile can be obtained by means of the invention.

10 Claims, No Drawings

THERMOPLASTIC LAMINATES

SUMMARY OF THE INVENTION

The present invention relates to thermoplastic laminates. More particularly it relates to thermoplastic laminates of polyesters and polyamides frictionally bonded to one another due, at least in part, to the presence in the polyester layer of a compound containing at least two isocyanate groups.

BACKGROUND OF THE INVENTION

Polyamides and polyesters have been used in prior art laminates but are unsuitable in a number of applications. For example, polyamides are not weather-resistant since they age when exposed to light and absorb moisture from the atmosphere. This leads to discoloration, deterioration of the mechanical properties and warpage phenomena. Although polyamides have good mechanical properties, particularly good toughness, they have an intrinsicly poor barrier action; for example, polar substances can easily migrate through polyamides. This is a serious disadvantage in, e.g., motor fuel lines in which alcohol-containing fuel is conveyed.

Polyesters are generally highly weather-resistant and have outstanding barrier action against both polar and nonpolar media. However, they are generally impact-sensitive, and, in particular, the notched bar impact strength is unsatisfactory. Polyesters therefore cannot be used in many applications where properties such as high thermal stability and good toughness are desired.

DESCRIPTION OF THE PRIOR ART

DE-C-3 827 092 describes a laminated pipe which has, proceeding from the interior to the exterior, separate layers of polyamide, polyvinyl alcohol, polyamide and polyester. The polyester is used here only as a thin outer layer in order to achieve short-term heat distortion resistance. The person skilled in the art knows, however, that the great majority of polymers, and therefore polyamides and polyesters, are mutually incompatible. This is why no adhesion is achieved between the layers of laminates. However, in technical applications, a frictional bond between the individual polymer layers is absolutely essential.

EP-A-287 839 discloses laminates composed of special polyamide mixtures and various other thermoplastics, for example polyethylene terephthalate, where an adhesion promoter has been injected between the two layers in order to produce a bond between them. The reference indicates that suitable adhesion promoters are functionalized polyolefins, functionalized ethylene/vinyl acetate copolymers, ethylene/acrylate copolymers, ionomers, polyalkylene oxide/polyester block copolymers, derivatives of carboxymethylcellulose, and blends of these polymers with polyolefins.

It has now been found that these adhesion promoters do not produce a stable frictional bond, especially in polyamide/polyester systems. In those cases in which a certain degree of frictional bonding can in fact be initially achieved, it is lost on heating or under the action of solvents, because the adhesion promoters are not sufficiently heat distortion resistant and/or solvent resistant. In addition, such laminates fail under shear loading due to cold flow of the adhesion promoter.

OBJECTS OF THE INVENTION

In view of these problems encountered in the prior art it is an object of the present invention to produce a solvent-resistant and thermally stable bond between a polyester and a polyamide that is unaffected by shear stress, etc., and which provides good mechanical properties. In particular, an object of the present invention is to provide a strong cohesive bond at the phase interfaces of polyester-polyamide laminates.

DETAILED DESCRIPTION OF THE INVENTION

The above objects are achieved by thermoplastic laminates containing

I. at least one layer of a molding composition based on polyamide and
II. at least one layer of a molding composition based on a mixture of
   a. 60 to 99% by weight of a linear, crystalline polyester and
   b. 1 to 40% by weight of a compound containing at least two isocyanate groups, wherein component II contains the isocyanate groups originating from component IIb at a concentration of between 0.03 and 3% by weight, wherein the two layers I and II are frictionally bonded to one another.

Component II is composed of 60 to 99, preferably 70 to 98, and in particular of 90 to 97.5% by weight of component IIa and 1 to 40, preferably 2 to 30, and in particular 2.5 to 10% by weight of component IIb. The isocyanate groups originating from component IIb are present in component II in a concentration of between 0.03 and 3% by weight, preferably between 0.3 and 1.8% by weight.

Polyamides that may be used in the present invention laminates are primarily homocondensates and copolycondensates. Examples are the 4,6-, 6,6-, 6,12-, 8,10-, 10,10-polyamides and the like. The 6-, 10,12-, 11-, 12- and 12,12-polyamides are preferred when the identification of the above polyamides corresponds to the international convention, in which the first number, denotes the number of carbon atoms in the starting diamine and the last number denotes the number of carbon atoms in the dicarboxylic acid. If only one number is specified, this means that the starting compound is an α,ω-aminocarboxylic acid or the lactam derived therefrom, H. Domininghaus, Die Kunststoffe und ihre Eigenschaften, p. 272, VDI-Verlag (1976).

Where copolyamides are used, these may contain, for example, adipic acid, sebacic acid, suberic acid, isophthalic acid or terephthalic acid as co-acid, or bis(4'-aminocyclohexyl)methane, trimethylhexamethylenediamine, hexamethylenediamine or the like as co-diamine. The preparation of these polyamides is known, for example, from D. B. Jacobs, J. Zimmermann, Polymerization Processes, pp. 424–67; Interscience Publishers, New York (1977); DE-B-2 152 194).

Also suitable as polyamides are mixed aliphatic-/aromatic polycondensates as described for example in U.S. Pat. Nos. 2,071,250; 2,071,251; 2,130,523; 2,130,948; 2,241,322; 2,312,966; 2,512,606; 3,393,210 and in Kirk-Othmer, Encyclopedia of Chemical Technology, 3rd edition, Vol. 188, pp. 328 and 435 (Wiley & Sons (1982)). As polyamides, suitable polycondensates also include poly(ether ester amides) and poly(etheramides). Such products are described for example in DE-A-2,712,987, DE-A-2,523,991, and DE-A-3,06,961.

The molecular weight (number average) of the invention polyamides is preferably above 5,000, more preferably above 10,000, which correspond to a relative viscosity ($\eta$ rel) in the range from 1.5 to 2.8. In a preferred embodiment polyamides in which at least 50% of all terminal groups are amino groups are used as component I. Moreover, the aforementioned polyamides may be used individually or in mixtures.

The linear, partially or wholly crystalline polyesters (component IIa) of the present invention have the following basic structure:

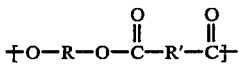

where R is a divalent branched or straight-chain aliphatic and/or cycloaliphatic radical having 2 to 12, preferably 2 to 8, carbon atoms in the carbon chain, and R' is a divalent aromatic radical having 6 to 20, preferably 8 to 12, carbon atoms in the carbon skeleton.

Examples of diols used in preparing the above polyesters are ethylene glycol, trimethylene glycol, tetramethylene glycol, hexamethylene glycol, neopentyl glycol, cyclohexanedimethanol and the like. Up to 25 mol % of the aforementioned diol may be replaced by a second diol of the kind already mentioned above, or by a diol having the following formula:

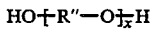

where R'' is a divalent radical having 2 to 4 carbon atoms and x may have a value from 2 to 50. The diols used are preferably ethylene glycol and tetramethylene glycol.

Suitable aromatic dicarboxylic acids that may be used in preparing the invention polyesters are, for example, terephthalic acid, isophthalic acid, 1,4-, 1,5-, 2,6- and 2,7-naphthalenedicarboxylic acid diphenic acid and oxydiphenyl-4,4'-dicarboxylic acid. Up to 20 mol % of these dicarboxylic acids may be replaced by aliphatic dicarboxylic acids like, for example, succinic acid, maleic acid, fumaric acid, sebacic acid or dodecanedicarboxylic acid, among others.

The preparation of linear, crystalline polyesters is known from, for example, DE-A-2,407,155; 2,407,156 and Ullmanns Encyclopädie der technischen Chemie, 4th edition, Vol. 19, p. 65 ff. (Verlag Chemie GmbH, Weinheim, 1980). The polyesters used according to the invention preferably have a viscosity number (J value) in the range from 80 to 240 cm³/g and a crystallinity of 25-100% including 50, 60, 70, 80 and 90%.

The polyamides (component I) and/or the linear, crystalline polyesters (component IIa) of the present invention may contain up to 40% by weight of other thermoplastic materials as long as the latter do not affect the bonding capability between the polyamide and polyester. In particular, these materials include polycarbonates [H. Schnell, Chemistry and Physics of Polycarbonates, Interscience Publishers, New York (1981)], acrylonitrile/styrene/butadiene copolymers (Houben-Weyl, Methoden der organischen Chemie, Vol. 14/1, Georg Thieme Verlag Stuttgart, pp. 393-406; Ullmanns Encyclopädie der technischen Chemie, 4th edition, Vol. 19, Verlag Chemie Weinheim (1981), pp. 279-284), acrylonitrile/styrene/acrylate copolymers (Ullmanns Encyclopädie der technischen Chemie, 4th edition, Vol. 19, Verlag Chemie Weinheim (1981), pp. 277-295), acrylonitrile/styrene copolymers (Ullmanns Encyclopädie der technischen Chemie, 4th edition, Vol. 19, Verlag Chemie Weinheim (1981), p. 273 ff.) and polyphenylene ethers(DE-A-3,224,691 and 3,224,692, U.S. application Ser. Nos. 3,306,87-4, 3,306,875 and 4,028,341).

If necessary, the polyamides and/or polyesters of the present laminates may be impact modified. Examples of suitable polymers are ethylene/propylene or ethylene/propylene/diene copolymers (EP-A-295 076), polypentenylene, polyoctenylene or random and/or block copolymers composed of aromatic alkenyl compounds and aliphatic olefins or dienes (EP-A-261 748). Impact-modifying rubbers may also be used, for example core/shell rubbers having a tough elastic core of (meth)acrylate, butadiene or styrene/butadiene rubbers having glass transition temperatures $T_g < -10°$ C., the core being optionally crosslinked. The shell may be composed of styrene and/or methyl methacrylate and/or further unsaturated monomers (DE-A-2 144 528, 3 728 685). The proportion of impact-modifying component should be chosen so that the desired properties of the laminate are not impaired.

The compounds used as component IIb in the present laminates carry at least two isocyanate groups. Difunctional and higher-functional isocyanates are suitable. In particular, aromatic and (cyclo)aliphatic isocyanates, for example 1,4-phenylene diisocyanate, 2,4-toluylene diisocyanate, 2,6-toluylene diisocyanate, 1,5-naphthalene diisocyanate, 1,6-hexamethylene diisocyanate, diphenylmethane 2,4-diisocyanate, diphenylmethane 4,4'-diisocyanate, diphenylmethane 2,2'-diisocyanate, isophorone diisocyanate, 1,4-tetramethylene diisocyanate, 1,12-dodecane diisocyanate and triphenylmethane 4,4',4''-triisocyanate may be used. Further examples are cyclohexane 1,3-diisocyanate, cyclohexane 1,4-diisocyanate, cyclobutane 1,3-diisocyanate, 2,4-hexahydrotoluylene diisocyanate, 2,6-hexahydrotoluylene diisocyanate, hexahydro-1,3-phenylene diisocyanate, hexahydro-1,4-phenylene diisocyanate, norbornane diisocyanate, p- or m-xylylene diisocyanates, perhydro-2,4-diphenylmethane diisocyanate and perhydro-4,4'-diphenylmethane diisocyanate. Mixtures of any of the above materials may be used as well.

Also suitable are isocyanates which further contain isocyanurate, urethane, acylated urea, biuret, carbodiimide or ester groups. In addition, oligomeric isocyanates containing fatty acid or perchlorinated aryl isocyanates may be used. The isocyanates may also be blocked isocyanates. Examples are reaction products of the aforementioned isocyanates with diols, lactams or oximes. Again, mixtures of these compounds with any other of the mentioned suitable component IIb materials may be used. 2,4- and 2,6-Tolulene diisocyanates and also isocyanates which contain isocyanurate, urethane, urea or biuret groups are preferred. Isophorone diisocyanates and isocyanurates derived therefrom, and also mixtures produced therefrom, are further preferred.

Component II is prepared according to known methods by melt mixing components IIa and IIb in a mixing apparatus having a good kneading action, etc., (for example a twin-screw extruder), at temperatures that are adjusted according to the melting points of components IIa and IIb, in general at temperatures between 200° and 300° C.

The catalysts that are normally used in the processing of isocyanates may be employed in the preparation of component II. Component II should be stored dry and with the exclusion of atmospheric moisture before the preparation of the invention thermoplastic laminates.

The above-described preparation of component II may also take place directly in a feed extruder of the co-extrusion unit or injection molding unit used for the preparation of the thermoplastic laminates themselves, so that component II can be processed directly following its preparation, without further intermediate storage, into a layer of the invention thermoplastic laminate.

Component I and also Component II may further contain conventional auxiliaries and additives, for example flame-proofing agents, stabilizers, processing aids, viscosity improvers, fillers, pigments, and the like. The amount thereof is chosen so that the desired properties are not seriously affected, and can vary from 0.01 to 70% wt. % and more.

The invention laminates may be fabricated in one stage or several stages. In the one-stage injection molding process the various melts are placed in a mold and the molding is allowed to cool (multicomponent injection molding), the various melts being co-extruded in a conventional manner.

In the multistage processes a molding is first produced either from component I or component II, and is then combined with the remaining components by compression molding, injection molding or extrusion.

The laminates according to the invention exhibit outstanding resistance and barrier action against the diffusion of chemicals, solvents and fuels. Furthermore, the two layers of the laminate are frictionally bonded to one another, so that the various layers do not shear from one another, for example during thermal expansion or the bending of a tube. In addition, it is also possible to fabricate materials that contain the laminates according to the invention in an alternating stacking arrangement to the desired thickness.

The laminates according to the invention are used in structural components, particularly in the electrical, mechanical engineering and automobile arts, where the rigidity of the polyester is to be combined with the toughness of the polyamide, or where the disadvantageous properties of the polyamide, such as poor UV resistance, insufficient scratch resistance or a poor barrier action, are to be compensated by a coating of polyester. In particular, the laminates are also used as films and sheets, especially as food packaging films, or as hollow profiles, for example as tubing in the automobile art.

Having generally described this invention, a further understanding can be obtained by reference to certain specific examples which are provided herein for purposes of illustration only and are not intended to be limiting unless otherwise specified. The results given in the examples were obtained using the following measurement methods:

The solution viscosity (relative viscosity $\eta_{rel}$) of the polyamides was determined using a 0.5% by weight m-cresol solution at 25° C. in accordance with DIN 53 727/ISO 307.

In order to determine the terminal amino groups, 1 g of component I is dissolved in 50 ml of m-cresol at 25° C. The solution is titrated potentiometrically with perchloric acid.

In order to determine the terminal carboxyl groups in component I, 1 g of polycondensate is dissolved in 50 ml of benzyl alcohol under a blanket of nitrogen at 165° C. The dissolution time is at most 20 minutes. The solution is titrated with a solution of KOH in ethylene glycol (0.05 mol KOH/l) against phenolphthalein until the color changes.

The solution viscosity (viscosity number J) of the polyesters is determined in a 0.5% by weight phenol/o-dichlorobenzene solution (weight ratio 1:1) at 25° C. in accordance with DIN 53 728/ISO 1628/5 - Part 5.

For determining the isocyanate groups, 6 g of component II (polyester+isocyanate) are dissolved at 180° C. in a dichlorobenzene/dibutylamine mixture (80:20 vol %). The solution is titrated at 20° C. with 10% strength hydrochloric acid against bromophenol as indicator (DIN 53 185).

The mechanical separability at the interface is tested using a metal wedge (wedge angle 5°; weight 2.5 kg) by attempting to separate the material boundary layer being tested. If the components separate at the boundary, the adhesion is poor. If, however, separation occurs wholly or partly within one of the two components, the adhesion is considered good.

Examples signified by letters are not according to the invention.

EXAMPLES

A. Component I.

A1: Polyamide 12 ($\eta_{rel}$: 2.08; 30% of the terminal groups are amino groups; 16 mmol/kg of terminal amino groups; 36 mmol/kg of terminal carboxyl groups)

A2: Polyamide 12 ($\eta_{rel}$: 2.10; 30% of the terminal groups are amino groups; 15 mmol/kg of terminal amino groups; 34 mmol/kg of terminal carboxyl groups; modified with 15% by weight of a commercially available plasticizer, which is a N-n-butyl-benzene-sulfonic acid amide.

A3: Polyamide 6,12 ($\eta_{rel}$: 1.9; 88% of the terminal groups are amino groups; 93 mmol/kg of terminal amino groups; 29 mmol/kg of terminal carboxyl groups)

A4: Polyamide 6 ($\eta_{rel}$: 2.01; 51.6% of the terminal groups are amino groups; 33 mmol/kg of terminal amino groups; 31 mmol/kg of terminal carboxyl groups)

A5: Polyamide 12 ($\eta_{rel}$: 1.9; 86% of the terminal groups are amino groups; 60 mmol/kg of terminal amino groups; 10 mmol/kg of terminal carboxyl groups)

A6: Polyamide 12 ($\eta_{rel}$: 2.0; 86.2% of the terminal groups are amino groups; 50 mmol/kg of terminal amino groups; 8 mmol/kg of terminal carboxyl groups; modified with 15% by weight of commercially available plasticizer, which is a N-n-butyl-benzene-sulfonic acid amide.

B. Component II.

B1: Homopolybutylene terephthalate (J value: 165 cm$^3$/g; VESTODUR ® 3000 - HÜLS AG; NCO content=0)

B2: Homopolybutylene terephthalate (J value: 145 cm$^3$/g; VESTODUR ® 2000 - HÜLS AG; NCO content=0)

B3: Homopolybutylene terephthalate (POLYCLEAR ® TR 86 - HOECHST AG; NCO content=0)

B4: Mixture of
a. 80% by weight of homopolybutylene terephthalate (J value 110 cm³/g) and
b. 20% by weight of maleic acid-modified EPM (maleic anhydride content: 0.7% by weight based on component B4b)
NCO content of mixture B4=0

B5: Homopolybutylene terephthalate (J value: 115 cm³/g; VESTODUR ® 1000 - HÜLS AG; NCO content=0)

B6: Mixture of
a. 90% by weight of homopolybutylene terephthalate (J value 115 cm³/g; VESTODUR ® 1000 - HÜLS AG) and
b. 10% by weight of isocyanurate of isophorone diisocyanate (trimeric isocyanate containing 12% by weight of NCO terminal groups based on component IIb.)
NCO group concentration in component II.: 0.6% by weight.

B7: Mixture of
a. 95% by weight of homopolybutylene terephthalate (J value 115 cm²/g; VESTODUR ® 1000 - HÜLS AG) and
b. 5% by weight of isocyanurate of isophorone diisocyanate (trimeric isocyanate containing 12% by weight of NCO terminal groups based on component IIb.)
NCO group concentration in component II: 0.3% by weight.

B8: Mixture of
a. 95% by weight of homopolybutylene terephthalate (J value 145 cm³/g; VESTODUR ® 2000 - HÜLS AG) and
b. 5% by weight of a mixture composed of
41.4% by weight of caprolactam
33.7% by weight of isocyanurate of isophorone diisocyanate
24.9% by weight of isophorone diisocyanate containing 14.8-15.8% by weight of NCO terminal groups based on component IIb.
NCO group concentration in component II.: 0.35% by weight.

B9: Mixture of
a. 97.5% by weight of homopolybutylene terephthalate (J value 115 cm³/g; VESTODUR ® 1000 - HÜLS AG) and
b. 2.5% by weight of a mixture composed of
41.4% by weight of caprolactam
33.7% by weight of isocyanurate of isophorone diisocyanate
24.9% by weight of isophorone diisocyanate containing 14.8-15.8% by weight of NCO terminal groups based on component IIb.
NCO group concentration in component II: 0.17% by weight.

C. Preparation of Laminates

Two-layer films and two-layer pressed sheets were produced by co-extrusion.

The two-layer films were produced in a laboratory co-extrusion apparatus whose two feed extruders had screw diameters of 25 mm and 30 mm. The cylinder temperatures were 220° C. (A2, A5, A6), 230° C. (A1), 240° C. (A3) and 250° C. (B1, B2, B3, B4, B5, B6, B7, B8, B9). The layer thicknesses were in each case 0.5 mm.

The pressed sheets were produced in a laboratory press at 270° C. and with a pressing time of 5 minutes (molding pressure: 80 bar).

TABLE

| Experiment | Component I | Component II | two-layer film after storage at 23° C. | at 150° C. in M15* | Mechanically separable at the interface | pressed sheet after storage at 23° C. in M15* | |
|---|---|---|---|---|---|---|---|
| A | A1 | B1 | yes | yes | yes | yes | yes |
| B | A2 | B2 | yes | yes | yes | yes | yes |
| C | A3 | B3 | yes | yes | yes | yes | yes |
| D | A1 | B4 | yes | yes | yes | yes | yes |
| E | A4 | B1 | yes | yes | yes | yes | yes |
| F | A5 | B5 | yes | yes | yes | yes | yes |
| 1 | A1 | B6 | no | no | no | no | no |
| 2 | A2 | B6 | no | no | no | no | no |
| 3 | A5 | B6 | no | no | no | no | no |
| 4 | A6 | B7 | no | no | no | no | no |
| 5 | A5 | B7 | no | no | no | no | no |
| 6 | A1 | B8 | no | no | no | no | no |
| 7 | A6 | B8 | no | no | no | no | no |
| 8 | A6 | B9 | no | no | no | no | no |
| 9 | A3 | B9 | no | no | no | no | no |

*Storage at 23° C. for 5 days in standard motor fuel M 15 (42.5 parts by volume of isooctane, 42.5 parts by volume of toluene, and 15 parts by volume of methanol).

The data in the above Table demonstrate the toughness of the bond between the layers of the invention laminates and compares them to laminates produced without component IIb; i.e., a material having at least two isocyanate groups. The differences between these materials is the difference between commercial success and failure.

While the present invention has been described in terms of its specific embodiments, certain modifications and equivalents will be apparent to those skilled in the art and are intended to be included within the scope of the present invention, which is to be limited only by scope of the appended claims.

What is claimed as new and desired to be secured by Letters Patent of the United States is:
1. A thermoplastic laminate comprising
I. at least one layer of a molding composition comprising a polyamide of a molecular weight (number average) of above 5,000 with a relative viscosity in the range of 1.5 to 2.8, and
II. at least one layer of a molding composition comprising a mixture of
a. 60 to 99% by weight of a linear, partially or wholly crystalline thermoplastic polyester of the structure:

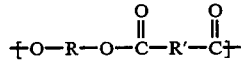

where R is a divalent branched or straight-chain aliphatic and/or cycloaliphatic radical having 2 to 12 carbon atoms in the carbon chain, and R' is divalent aromatic radical having 6 to 20 carbon atoms in the carbon skeleton, and
b. 1 to 40% by weight of a compound containing at least two isocyanate groups,
wherein component II contains isocyanate groups originating from component IIb at a concentration of between 0.03 and 3% by weight, wherein said two layers I, and II, are cohesively bonded directly to one another.

2. A thermoplastic laminate according to claim 1, wherein in the polyamide of component I at least 50% of all terminal groups present are amino groups.

3. A thermoplastic laminate according to claim 1 or 2, wherein component II is a molding composition comprising a mixture of
   a. 70 to 98% by weight of a linear, partially crystalline polyester and
   b. 2 to 30% by weight of a compound containing at least two isocyanate groups.

4. A thermoplastic laminate according to claim 1 or 2, wherein component II is a molding composition comprising a mixture of
   a. 90 to 97.5% by weight of a linear, partially crystalline polyester and
   b. 2.5 to 10% by weight of a compound containing at least two isocyanate groups.

5. A thermoplastic laminate according to claim 1 or 2, characterized in that the isocyanate groups originating from component IIb are present in component II at a concentration of between 0.3 and 1.8% by weight.

6. A thermoplastic laminate according to claim 1 or 2, wherein the compound containing at least two isocyanate groups of component IIb further contain isocyanurate, urethane, acylated urea, biuret, carbodiimide or ester groups.

7. A thermoplastic laminate according to claim 1 or 2, wherein component IIb comprises isophorone diisocyanate, an isocyanurate derived therefrom, or a mixture thereof.

8. A thermoplastic laminate according to claim 1 or 2, wherein said compound containing at least two isocyanate groups in component IIb is a lactam-blocked isocyanate.

9. A molded article comprising the thermoplastic laminate according to claim 1.

10. A molded article having a hollow profile comprising the thermoplastic laminate according to claim 1.

* * * * *